United States Patent
Arai

(10) Patent No.: US 10,311,640 B2
(45) Date of Patent: Jun. 4, 2019

(54) METHOD AND APPARATUS FOR PROVIDING VIRTUAL SPACE, AND NON-TRANSITORY COMPUTER READABLE DATA STORAGE MEDIUM STORING PROGRAM CAUSING COMPUTER TO PERFORM METHOD

(71) Applicant: COLOPL, INC., Tokyo (JP)

(72) Inventor: Yuichiro Arai, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/294,655

(22) Filed: Oct. 14, 2016

(65) Prior Publication Data

US 2017/0053452 A1  Feb. 23, 2017

Related U.S. Application Data

(63) Continuation of application No. PCT/JP2016/073324, filed on Aug. 8, 2016.

(30) Foreign Application Priority Data

Aug. 17, 2015  (JP) ................................ 2015-160451

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/225* (2013.01); *G06F 3/013* (2013.01);
(Continued)

(58) Field of Classification Search
CPC ..... G06T 19/006; G02B 27/225; G06F 3/013; H04N 13/0278; H04N 13/044; H04N 13/0484
See application file for complete search history.

(56) References Cited

U.S. PATENT DOCUMENTS 8,156,004 B2 *  4/2012  Wajihuddin ........... G06Q 30/02
                                                               463/31
2003/0126035 A1  7/2003  Kake et al.
(Continued)

FOREIGN PATENT DOCUMENTS

JP      2003-248844 A    9/2003
JP      2005-38008 A     2/2005
(Continued)

OTHER PUBLICATIONS

Atsushi Kametsu, Virtual Worlds Moving towards the "Multiverse" Era, New Business Outlook Seen in "Second Life," Chiteki Shisan Souzou, Nomura Research Institute, Ltd., Jul. 20, 2007, pp. 48-59, vol. 15, No. 8.
(Continued)

*Primary Examiner* — Chong Wu
(74) *Attorney, Agent, or Firm* — Hauptman Ham, LLP

(57) ABSTRACT

A content providing apparatus capable of approaching user's interests can be provided. A computer-implemented method for providing a content can generate a virtual space where the user is immersed and a target object in the virtual space, and define a reference position in the virtual space and a target object position. The method can define a reference direction which is a direction of a line of sight of the user with respect to the reference position, specify a direction of gaze at the target object, which is the direction of the line of sight of the user, specify a duration of gaze where the user has gazed at the target object, and specify an adjusted duration of gaze based on the duration of gaze, the direction of gaze, and the reference direction. A prescribed content is provided to the user based on the adjusted duration of gaze.

4 Claims, 24 Drawing Sheets

(51) Int. Cl.
  *G02B 27/22* (2018.01)
  *H04N 13/344* (2018.01)
  *H04N 13/383* (2018.01)
  *G06F 3/0484* (2013.01)
  *H04N 13/279* (2018.01)

(52) U.S. Cl.
  CPC ....... *G06F 3/04842* (2013.01); *H04N 13/279* (2018.05); *H04N 13/344* (2018.05); *H04N 13/383* (2018.05)

(56) References Cited

U.S. PATENT DOCUMENTS

| | | | |
|---|---|---|---|
| 2005/0179685 A1 | 8/2005 | Kake et al. | |
| 2011/0298702 A1 | 12/2011 | Sakata et al. | |
| 2013/0106692 A1* | 5/2013 | Maizels | G06F 3/011 345/156 |
| 2014/0368533 A1* | 12/2014 | Salter | G02B 27/017 345/619 |
| 2015/0153570 A1 | 6/2015 | Yamamoto et al. | |
| 2015/0317518 A1* | 11/2015 | Fujimaki | G08C 17/02 345/633 |
| 2016/0026242 A1* | 1/2016 | Burns | H04N 9/31 345/633 |

FOREIGN PATENT DOCUMENTS

| | | |
|---|---|---|
| JP | 2014-71811 A | 4/2014 |
| JP | 2015-114798 A | 6/2015 |
| WO | 2011/074198 A1 | 6/2011 |

OTHER PUBLICATIONS

Yuya Nomata et al., Dynamic Generation of Virtual Space based on User's Actions, Technical Report of IEICE, The Institute of Electronics, Information and Communication Engineers, Jul. 9, 2004, pp. 1-6, vol. 104, No. 196.

International Search Report in PCT/JP2016/073324, dated Sep. 6, 2016.

* cited by examiner

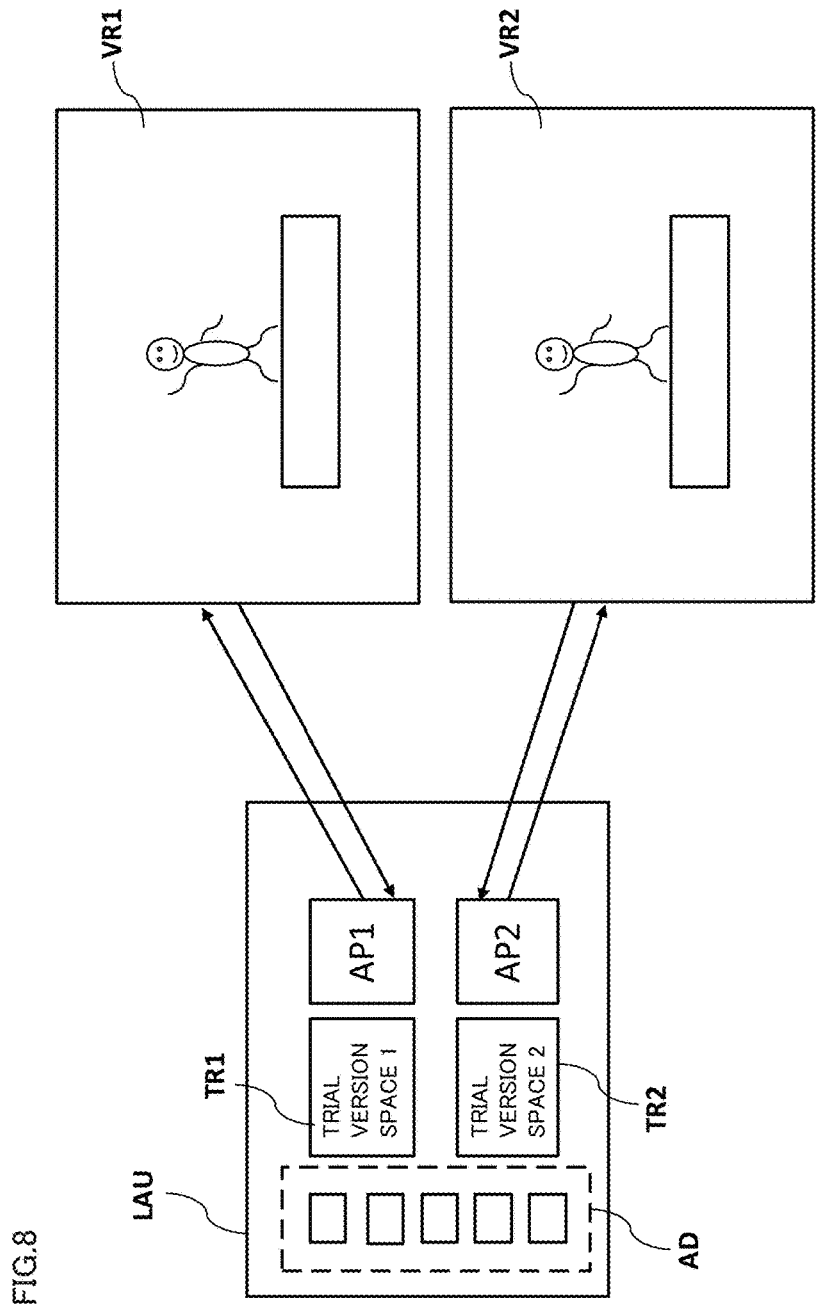

FIG.14

| APPLICATION | TIME OF GAZE | NAME OF ADVERTISEMENT | POSITION OF ARRANGEMENT (x,y,z) | USER POSITION AT THE TIME OF GAZE (x,y,z) | ANGLE OF GAZE (θx) | ANGLE OF GAZE (θy) | DURATION OF GAZE | ADJUSTED DURATION OF GAZE |
|---|---|---|---|---|---|---|---|---|
| 1 | aa:bb:cc | A | (x1,y1,z1) | (0,0,0) | 20° | 5° | 10 SECONDS | 12 SECONDS |
| 1 | ab:bb:cc | A-1 | (x2,y2,z2) | (x0,0,0) | 25° | 2° | 1 SECOND | 2 SECONDS |
| 1 | ab:bb:bc | A-2 | (x3,y3,z3) | (0,y0,0) | 15° | 8° | 20 SECONDS | 25 SECONDS |
| 2 | aa:ab:cc | B | (x4,y4,z4) | (0,0,z0) | 20° | 80° | 17 SECONDS | 35 SECONDS |
| 2 | aa:bb:ac | B-1 | (x5,y5,z5) | (x0,y0,0) | 30° | 75° | 5 SECONDS | 10 SECONDS |
| 2 | ba:bb:cc | B-2 | (x6,y6,z6) | (x0,0,z0) | 35° | 85° | 2 SECONDS | 5 SECONDS |
| 2 | ba:bb:cb | A-2 | (x2,y2,z2) | (0,y0,0) | 20° | 2° | 3 SECONDS | 5 SECONDS |
| ... | ... | ... | ... | ... | ... | ... | ... | ... |

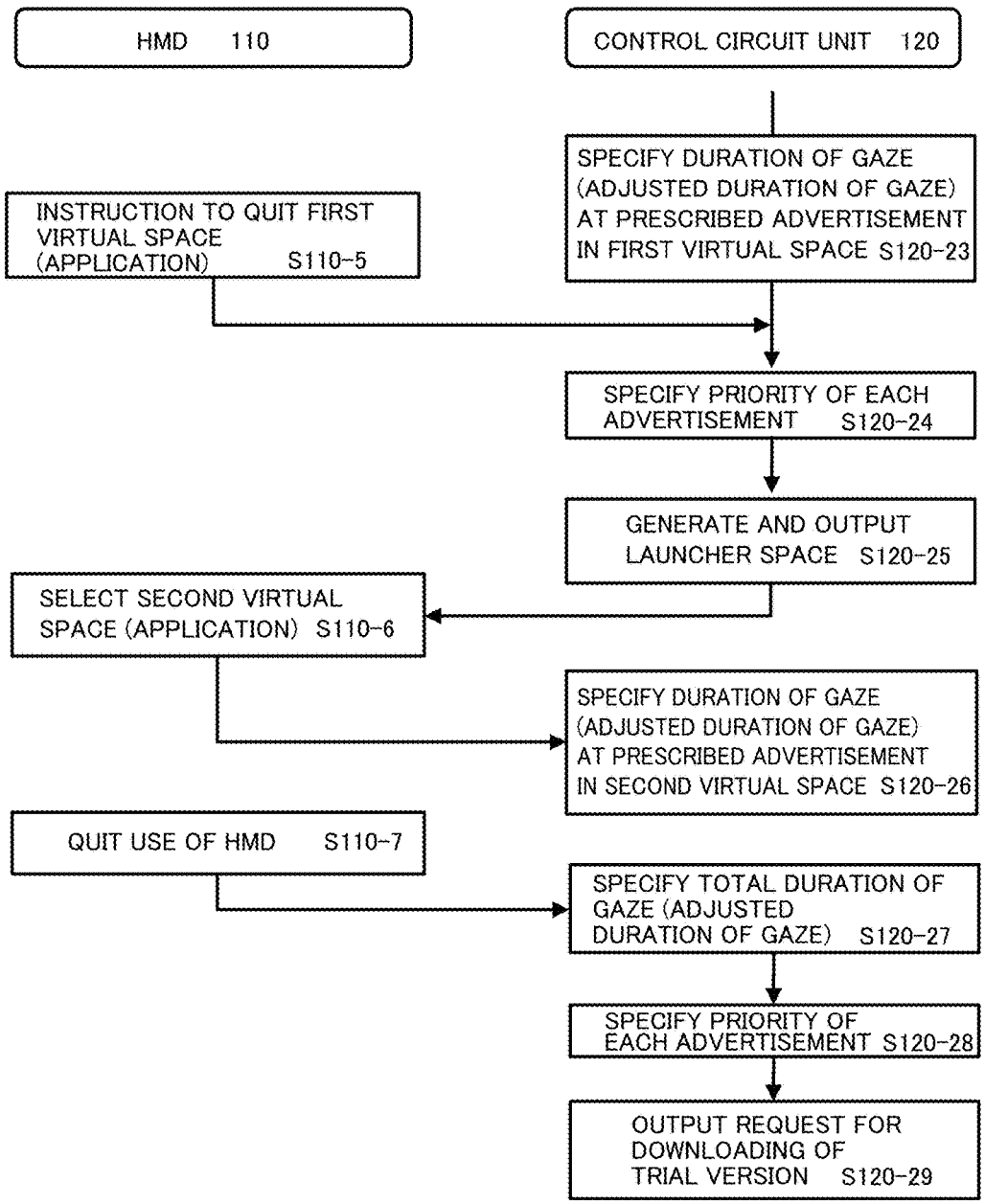

| NAME OF ADVERTISEMENT | TOTAL ADJUSTED DURATION OF GAZE | THRESHOLD VALUE EXCESS FLAG | PRIORITY | TRIAL VERSION CONTENT |
|---|---|---|---|---|
| A | 12 SECONDS | ✓ | 3 | |
| A-1 | 2 SECONDS | | - | ✓ |
| A-2 | 30 SECONDS | ✓ | 2 | |
| B | 35 SECONDS | ✓ | 1 | ✓ |
| B-1 | 10 SECONDS | ✓ | 4 | ✓ |
| B-2 | 5 SECONDS | ✓ | 5 | |
| ... | ... | ... | ... | ... |

METHOD AND APPARATUS FOR PROVIDING VIRTUAL SPACE, AND NON-TRANSITORY COMPUTER READABLE DATA STORAGE MEDIUM STORING PROGRAM CAUSING COMPUTER TO PERFORM METHOD

CROSS REFERENCE TO RELATED PATENT APPLICATIONS

The present application is a continuation application of International Application No. PCT/JP2016/073324 filed Aug. 8, 2016, which claims priority to Japanese Patent Application No. 2015-160451 filed Aug. 17, 2015. The contents of these applications are incorporated herein by reference in their entirety.

FIELD

The present disclosure relates to generation of a virtual space in which a user is immersed with the use of a head-mounted display (HMD).

DESCRIPTION OF THE RELATED ART

In connection with a representation in a virtual world, for example, Japanese Patent Laying-Open No. 2003-248844 (Patent Document 1) discloses a technology relating to "method, apparatus, and system for displaying an object such as a billboard and a message board in a virtual world that is provided by a server on a designated network such as the Internet and method for setting a land value and an advertisement fee in the virtual world" (see paragraph 0001).

Japanese Patent Laying-Open No. 2014-71811 (Patent Document 2) discloses a technology "to provide, while a user is engaged in some activity, information to the user in a format enabling the user to reliably notice information that matches the activity" (see Abstract).

SUMMARY

In the technologies described in Patent Documents 1 and 2, a large amount of user information should be collected in order to provide a content such as an appropriate advertisement to a user. Therefore, there is a room for improvement in timely approach to user's interests.

According to one embodiment, a computer-implemented method for providing a virtual space in which a user is immersed is provided. The method comprises generating a virtual space in which the user is immersed and a target object in the virtual space, defining a reference position in the virtual space and a target object position where the target object is arranged, defining a reference direction which is a direction of a line of sight of the user with respect to the reference position, specifying a direction of gaze at the target object which is the direction of the line of sight of the user, specifying a duration of gaze in which the user has gazed at the target object, specifying an adjusted duration of gaze based on the duration of gaze, the direction of gaze, and the reference direction, and providing a prescribed content to the user based on the adjusted duration of gaze.

In one embodiment, a content which can timely approach user's interests can be provided.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a diagram for illustrating relation of a launcher space with a first virtual space and a second virtual space.

FIGS. 13A and 13B are diagrams showing a state of an advertisement in the sight region before the advertisement is gazed at.

FIG. 14 is a diagram showing a user action management table.

FIG. 15 is a flowchart showing processing for performing the functions of the HMD system.

FIG. 17 is a diagram showing a priority management table.

DESCRIPTION OF THE EMBODIMENTS

Figure 1:
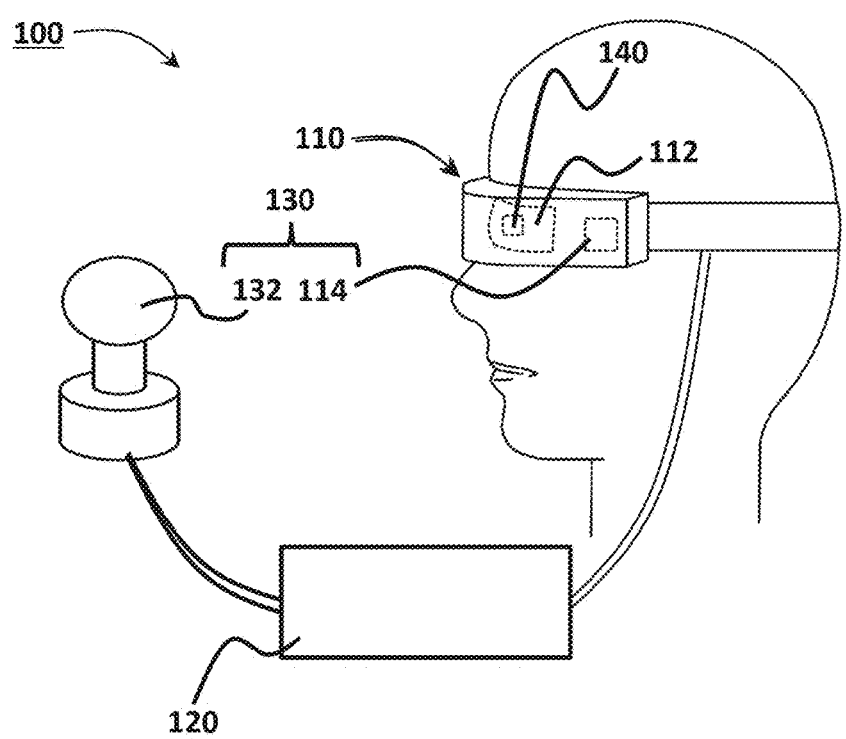
FIG. 1 is a diagram showing an HMD system according to one embodiment.

Contents of an embodiment of the present disclosure will initially be listed and described. A method and a program for controlling a head-mounted display system according to one embodiment of the present disclosure comprise a configuration below.

(Configuration 1)

According to one embodiment, a computer-implemented method for providing a virtual space in which a user is immersed is provided. The method comprises generating a virtual space in which the user is immersed and a target object in the virtual space, defining a reference position in the virtual space and a target object position where the target object is arranged, defining a reference direction which is a direction of a line of sight of the user with respect to the reference position, specifying a direction of gaze at the target object which is the direction of the line of sight of the user, specifying a duration of gaze in which the user has gazed at the target object, deriving an adjusted duration of gaze based on the duration of gaze, the direction of gaze, and the reference direction, and providing a prescribed content to the user based on the adjusted duration of gaze.

According to the method in the present configuration, based on a duration in which the user has gazed at a target object such as an advertisement, a content associated with the advertisement is provided to the user. A duration of gaze is adjusted based on relation between a direction of gaze by the user and the reference direction set in the virtual space. Thus, a content providing apparatus which can readily determine a target in which the user showed interests and can timely approach the target can be provided.

(Configuration 2)

In addition to configuration 1, the deriving an adjusted duration of gaze comprises calculating the adjusted duration of gaze by adjusting the duration of gaze based on an amount of deviation of the direction of gaze from the reference direction.

According to the method in the present configuration, when the user far averts the line of sight from the reference direction and gazes at a target object, it is estimated that the user is highly interested in the target. Thus, content providing means which can timely approach user's interests can be provided.

(Configuration 3)

In addition to configuration 2, the amount of deviation comprises a first amount of deviation which is an amount of deviation of the direction of gaze from the reference direction in a vertical plane and a second amount of deviation which is an amount of deviation of the direction of gaze from the reference direction in a horizontal plane orthogonal to the vertical plane. The calculating the adjusted duration of gaze comprises calculating the adjusted duration of gaze by providing a prescribed weight to the first amount of deviation and the second amount of deviation. According to the method comprising such a configuration, importance can be placed on an action which the user is less likely to voluntarily take.

(Configuration 4)

In addition to configuration 3, the weight is provided greater the first amount of deviation.

According to the method in the present configuration, content providing means which can timely approach user's interests by placing importance on an action by the user to move the line of sight in the vertical plane which is an action which the user is less likely to voluntarily take can be provided.

(Configuration 5)

The method further comprises, in addition to any configuration above, defining a sight region of the user based on the direction of the line of sight of the user, specifying a first object and a second object from a plurality of the target objects included in the sight region, and varying a representation of the second object so as to be associated with the first object when the adjusted duration of gaze at the first object by the user exceeds a prescribed threshold value.

According to the method comprising the configuration, when the user gazes at a prescribed target, another object in a field of view of the user is varied so as to be associated with the object which has been gazed at. Thus, a content providing apparatus which can timely approach user's interests can be provided.

(Configuration 6)

The method further comprises, in addition to any configuration above, providing the virtual space to the user by outputting the virtual space to a head-mounted display, setting a priority of the content provided to the user based on the adjusted duration of gaze, specifying an expansion content relating to the content based on the priority, and outputting a download request for downloading the expansion content when the user is not wearing the head-mounted display.

According to the method comprising the configuration, an expansion content associated with an advertisement (such as a trial version of a game) can be downloaded while the head-mounted display is not used. Thus, an expansion content can be provided without giving a user who is using the head-mounted display uncomfortableness such as a poorer communication condition.

(Configuration 7)

The method further comprises, in addition to configuration 6, generating a launcher space. The launcher space is associated with the virtual space and the expansion content, and the content is shown in accordance with the priority.

According to the method comprising the configuration, objects such as advertisements reflecting user's interests in a certain virtual space are shown in a list in the launcher space, so that user's feeling of immersion in the virtual space can be prevented from being impaired.

(Configuration 8)

The method further comprises, in addition to any configuration above, generating a second virtual space in which the user is immersed, generating in the second virtual space, a second target object associated with a first target object arranged in a first virtual space, specifying a total adjusted duration of gaze which is the sum of an adjusted duration of gaze at the first target object and an adjusted duration of gaze at the second target object by the user, and providing a prescribed content to the user based on the duration of gaze.

According to the method in the present configuration, a more appropriate advertisement can be proposed to the user by totaling actions by the user in connection with a history of the line of sight in a plurality of contents.

(Configuration 9)

According to another embodiment, a program causing the computer to perform the method above is provided. According to another embodiment, a non-transitory computer readable data storage medium storing the program is provided.

A specific example of a method and a program according to an embodiment will be described below with reference to the drawings. The present disclosure is not limited to such exemplifications but is defined by the terms of the claims and is intended to include any modifications within the scope and meaning equivalent to the terms of the claims. In the description below, the same elements in the description of the drawings have the same reference characters allotted and redundant description will not be repeated.

FIG. 1 shows an HMD system 100 comprising an HMD 110 according to one embodiment. HMD system 100 comprises HMD 110 attached to a head portion of a user, a control circuit unit 120, a motion sensor 130, and a gaze sensor 140.

HMD 110 comprises a display 112 which is a non-transmissive display device, a sensor unit 114, and gaze sensor 140. Control circuit unit 120 provides a three-dimensional image using a parallax between both eyes as a virtual space by showing an image for a right eye and an image for a left eye on display 112. As display 112 is arranged in front of the user's eyes, the user can be immersed in the virtual space. The virtual space comprises a background, various objects which can be operated by the user, and a menu image.

Display 112 may comprise a sub display for the right eye which shows an image for the right eye and a sub display for the left eye which shows an image for the left eye. So long as an image for the right eye and an image for the left eye can be shown, display 112 may consist of one display device. For example, one display device can independently show an image for the right eye and an image for the left eye by rapidly switching a shutter which allows recognition of a shown image by one eye.

Control circuit unit 120 is implemented by a computer connected to HMD 110. Control circuit unit 120 has display 112 show the virtual space by executing a stored prescribed application. Control circuit unit 120 performs processing so as to operate various objects shown in the virtual space or show and control various menu images. Control circuit unit 120 has a program stored which controls execution of such operations. Control circuit unit 120 does not have to be mounted on HMD 110 and may be implemented by different hardware (such as a known personal computer or a server computer through a network). Some of functions of control circuit unit 120 may be mounted on HMD 110 and remaining functions may be mounted on different hardware.

Motion sensor 130 detects information on a position and an inclination of HMD 110. Motion sensor 130 comprises sensor unit 114 and a detector 132. Sensor unit 114 may comprise a plurality of light sources. The light source comprises, for example, a light emitting diode (LED) which emits infrared rays. Detector 132 is implemented, for example, by an infrared sensor. Detector 132 detects over time, information on a position and an angle of HMD 110 in a real space in accordance with a motion of a user by sensing infrared rays from the light source as a point of sensing of HMD 110. Control circuit unit 120 can determine change over time in position or angle of HMD 110 based on change over time in information detected by detector 132 and can sense information on a motion of HMD 110.

Figure 2:
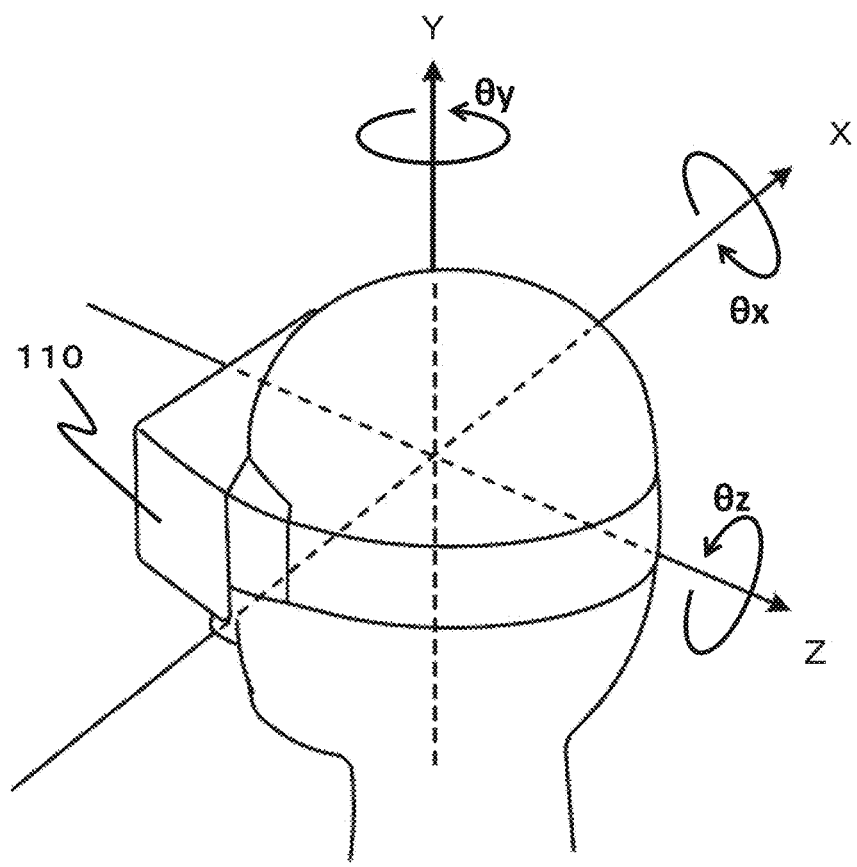
FIG. 2 is a diagram showing a rectangular coordinate system on a three-dimensional space defined around a head portion of a user who wears an HMD.

Referring to FIG. 2, information on a position or an inclination obtained by motion sensor 130 in one embodiment will be described. XYZ axes are defined around the head portion of the user who wears HMD 110. A vertical direction in which the user stands is defined as the Y axis. A front-rear direction which is orthogonal to the Y axis and connects the center of display 112 and the user to each other is defined as the Z axis. A lateral direction orthogonal to the Y axis and the Z axis is defined as the X axis. Change over time in position of the user in directions of the XYZ axes is thus obtained. Angles $\theta x$ (what is called a pitch angle), $\theta y$ (what is called a yaw angle), and $\theta z$ (what is called a roll angle) of inclination of HMD 110 around respective axes are obtained.

Motion sensor 130 may consist of one of sensor unit 114 and detector 132 which are fixed around display 112. Sensor unit 114 may be a geomagnetic sensor, an acceleration sensor, or an angular speed (a gyro) sensor. By employing at least one of these sensors, a position and an inclination of HMD 110 (in particular, display 112) attached to the head portion of the user are detected. Information on a motion of HMD 110 can thus be detected. For example, the angular speed sensor can detect over time an angular speed around three axes around HMD 110 in accordance with the motion of HMD 110 and determine change over time in angle around each axis. In this case, it is not necessary to provide detector 132. Detector 132 may comprise an optical camera. In this case, information on a motion of HMD 110 can be detected based on image information and it is not necessary to provide sensor unit 114.

Figure 3:
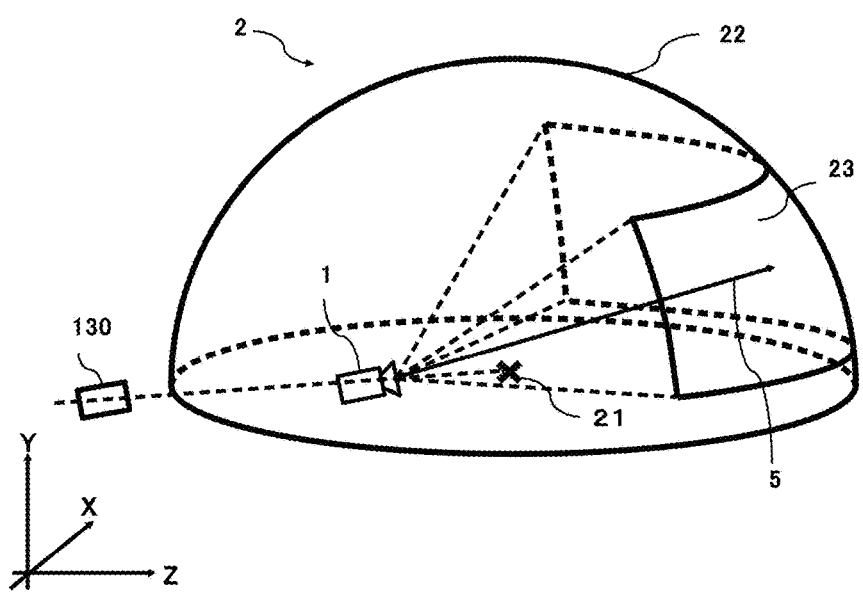
FIG. 3 is an XYZ space diagram showing one example of a virtual space.

A function to detect information on a position or an inclination of HMD 110 by using motion sensor 130 is referred to as position tracking. Referring to FIG. 3, relation between position tracking by motion sensor 130 and a virtual camera 1 arranged in a virtual space 2 in one embodiment will be described. In order to explain positional relation between virtual camera 1 and motion sensor 130, in the following, when HMD system 100 comprises detector 132, a position of motion sensor 130 is set at a position of detector 132. When HMD system 100 does not comprise detector 132, a position of motion sensor 130 is set at a position of sensor unit 114. Virtual camera 1 is arranged in virtual space 2 and motion sensor 130 is virtually arranged outside virtual space 2 (in a real space).

Virtual space 2 is formed like a celestial sphere having a plurality of substantially square or substantially rectangular meshes. Each mesh is associated with spatial information of virtual space 2 and a sight region 23 is defined based on this spatial information. In one embodiment, a center 21 of the celestial sphere is adjusted to always be arranged on a line which connects virtual camera 1 and motion sensor 130 to each other in the XZ plane. For example, when the user who wears HMD 110 moves and the position of virtual camera 1 moves in the X direction, a region of virtual space 2 is changed such that center 21 is located on a line segment between virtual camera 1 and motion sensor 130. In this case, a position of virtual camera 1 in virtual space 2 is fixed and an inclination changes. When a position of virtual camera 1 is moved in coordination with movement of motion sensor 130 in the XYZ directions, a position of virtual camera 1 in virtual space 2 is variably set.

Gaze sensor 140 has an eye tracking function to detect directions in which lines of sight of the right eye and the left eye of the user are directed. Gaze sensor 140 comprises a sensor for the right eye and a sensor for the left eye. The sensor for the right eye and the sensor for the left eye sense directions of the lines of sight of gaze by the user by detecting directions in which the lines of sight of the right eye and the left eye are directed, respectively. A known sensor with an eye tracking function can be adopted for gaze sensor 140, and for example, an angle of rotation of an eyeball may be found by irradiating the right eye and the left eye with infrared light and obtaining light reflected from a cornea or an iris.

Figure 4:
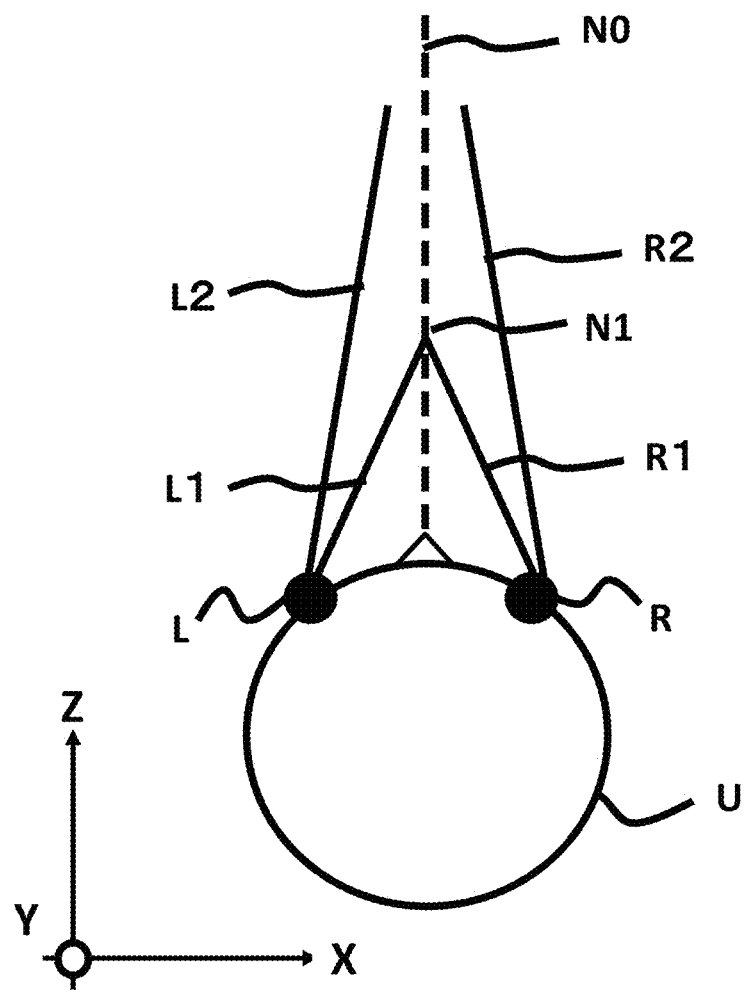
FIG. 4 is a diagram showing one example of a method of determining a direction of a line of sight.

As shown in FIG. 4, in one embodiment, gaze sensor 140 senses directions of the lines of sight of the right eye and the left eye of a user U. When user U looks into a short distance, lines of sight R1 and L1 are sensed and a point of gaze N1 which is an intersection therebetween is specified. When the user looks into a far distance, lines of sight R2 and L2 smaller in angle formed with respect to the Z direction than lines of sight R1 and L1 are specified. When point of gaze N1 is specified, a direction of line of sight N0 of user U is specified. Direction of line of sight N0 is a direction to which user U actually directs his/her lines of sight of both eyes. Direction of line of sight N0 is defined, for example, as a direction of extension of a straight line passing through the center between right eye R and left eye L of user U and point of gaze N1.

In one embodiment, HMD system 100 may comprise a headphone comprising a microphone in any element. The user can thus give a voice instruction to a prescribed object in the virtual space. In order to receive broadcasting of a television program at a virtual television in the virtual space, HMD system 100 may comprise a television receiver in any element. The HMD system may comprise a communication function for showing an electronic mail which the user received. HMD system 100 may comprise an external controller for inputting various commands from the user.

Figure 5:
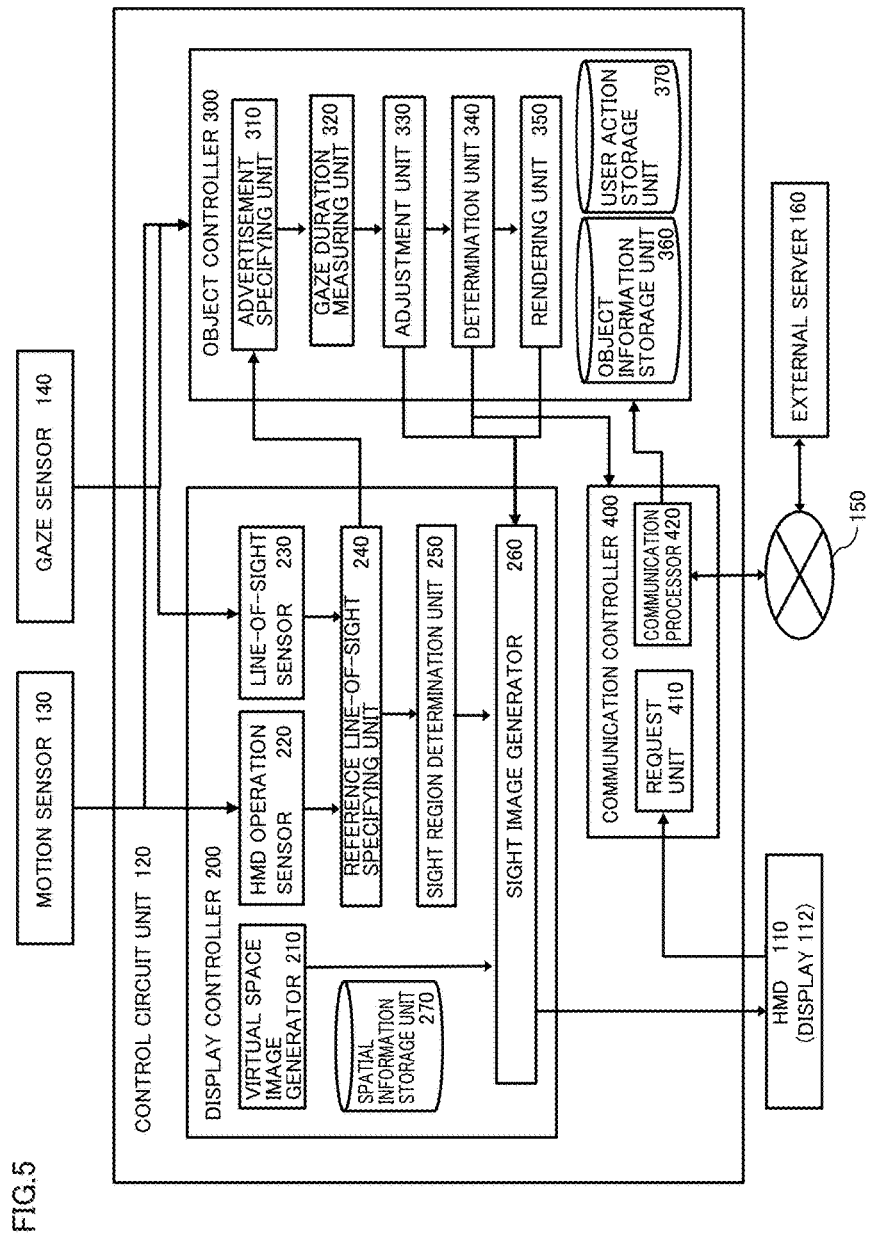
FIG. 5 is a block diagram showing functions of a control circuit unit for performing functions of the HMD system.

FIG. 5 is a block diagram showing a functional configuration of control circuit unit 120 for performing processing for showing virtual space 2, showing various menus shown in virtual space 2, or operating an object in HMD system 100 according to one embodiment. Control circuit unit 120 controls an image output to display 112 mainly based on an input from motion sensor 130 or an input from gaze sensor 140.

In one embodiment, control circuit unit 120 is implemented by a processor which executes instructions and a memory which holds instructions. Each function of control circuit unit 120 is performed as a software module by execution of instructions by the processor. In another embodiment, control circuit unit 120 may also be implemented by a combination of circuit elements for performing respective functions and other hardware modules.

Control circuit unit 120 comprises a display controller 200, an object controller 300, and a communication controller 400. Display controller 200 comprises a virtual space image generator 210, an HMD operation sensor 220, a line-of-sight sensor 230, a reference line-of-sight specifying unit 240, a sight region determination unit 250, a sight image generator 260, and a spatial information storage unit 270. Object controller 300 comprises an advertisement specifying unit 310, a gaze duration measuring unit 320, an adjustment unit 330, a determination unit 340, a rendering unit 350, an object information storage unit 360, and a user action storage unit 370.

In one embodiment, spatial information storage unit 270, object information storage unit 360, and user action storage unit 370 may be implemented by a computer readable data storage medium such as a random access memory (RAM) and other volatile data storage media or a flash memory and other non-volatile data storage media.

Motion sensor 130 and gaze sensor 140 are connected to display controller 200 and object controller 300 so as to be able to communicate therewith and may be connected through a wired or wireless communication interface. Display controller 200, object controller 300, and a communication controller 400 are connected to HMD 110 (display 112) so as to be able to communicate therewith and may be connected through a wired or wireless communication interface. Communication controller 400 can communicate with an external server 160 through a network 150. Spatial information storage unit 270, object information storage unit 360, and user action storage unit 370 store various types of data for providing output information corresponding to inputs from motion sensor 130 or gaze sensor 140 to display 112.

Figure 6:
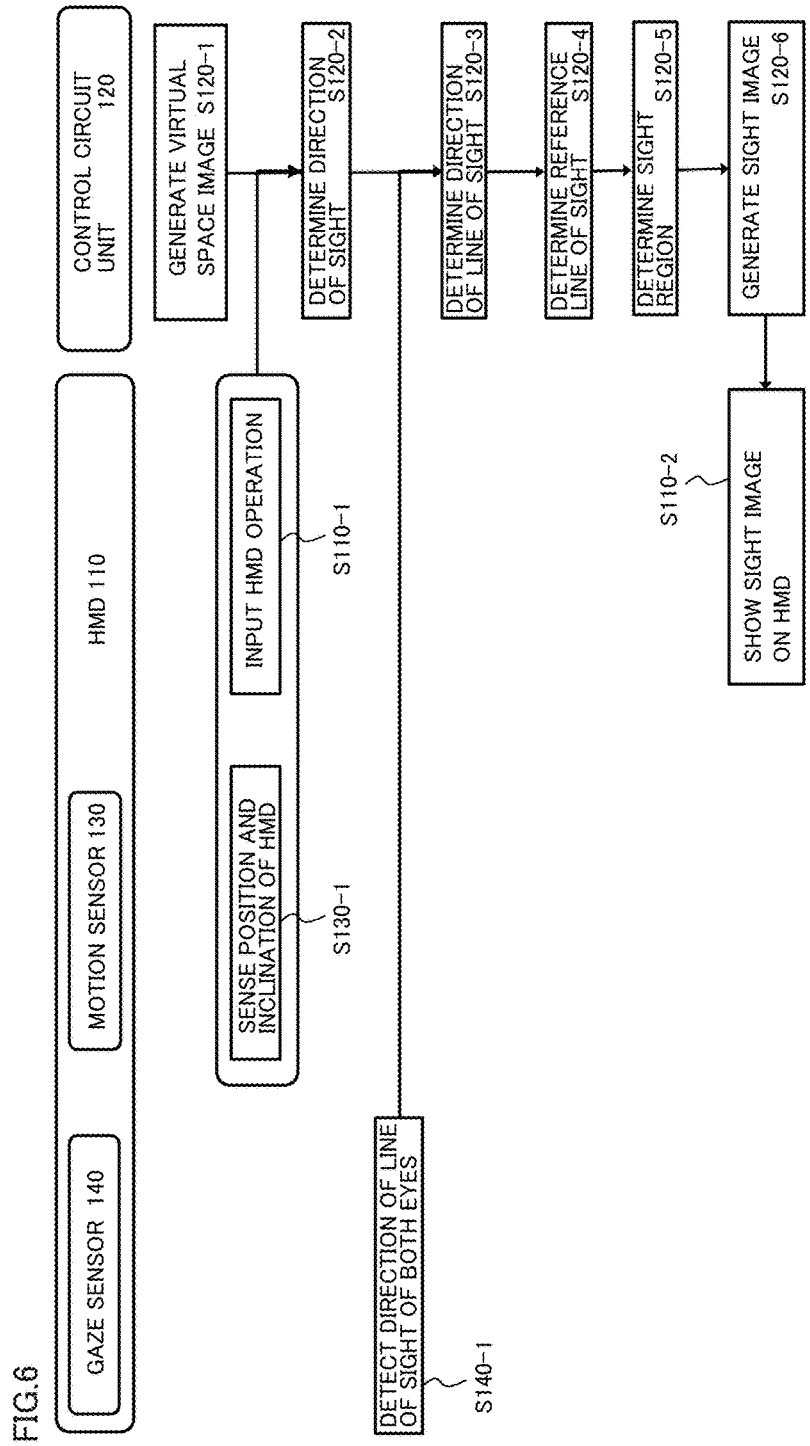
FIG. 6 is a flowchart showing processing for performing the functions of the HMD system.

Referring to FIGS. 5 and 6, a processing flow in HMD system 100 for providing virtual space 2 according to one embodiment will be described. Virtual space 2 may be provided as a result of interaction between HMD 110 (gaze sensor 140 and motion sensor 130) and control circuit unit 120.

Initially, virtual space image generator 210 of control circuit unit 120 generates a virtual space image 22 in a form of a celestial sphere configuring a virtual space 2 in which the user is immersed (step S120-1). When an operation such as movement or inclination is input from the user to HMD 110 (step S110-1), motion sensor 130 senses a position or an inclination of HMD 110 (step S130-1). Sensing information from motion sensor 130 is transmitted to control circuit unit 120 and HMD operation sensor 220 accepts positional information or inclination information of HMD 110. Control circuit unit 120 thus determines a direction of a line of sight based on positional information or inclination information of HMD 110 (step S120-2). When gaze sensor 140 detects motion of eyeballs of the left and right eyes of the user (step S140-1), information representing the motion is transmitted to control circuit unit 120. Line-of-sight sensor 230 specifies a direction to which lines of sight of the right eye and the left eye are directed and specifies direction of line of sight N0 (step S120-3). Reference line-of-sight specifying unit 240 specifies the direction of the line of sight specified based on inclination of HMD 110 or direction of line of sight N0 of the user as a reference line of sight 5 (step S120-4).

Figure 7A:
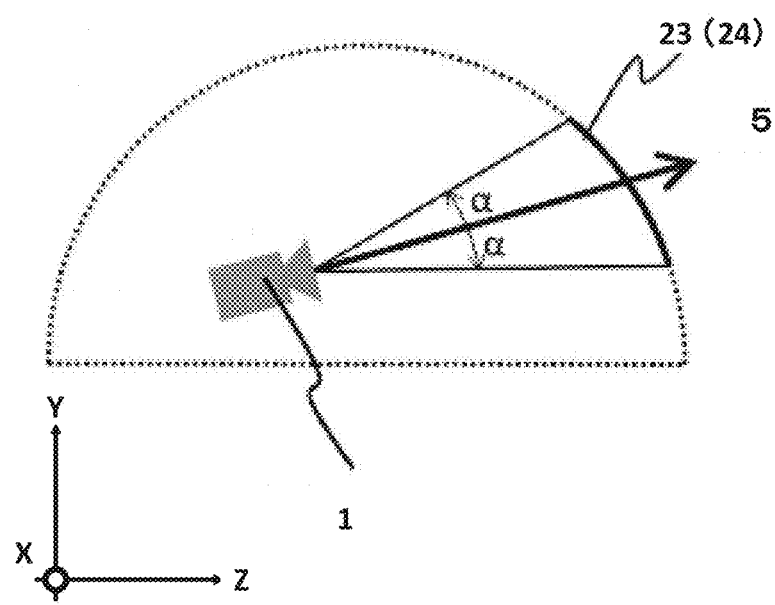
FIG. 7A is a YZ plane diagram when a sight region is viewed in an X direction.
Figure 7B:
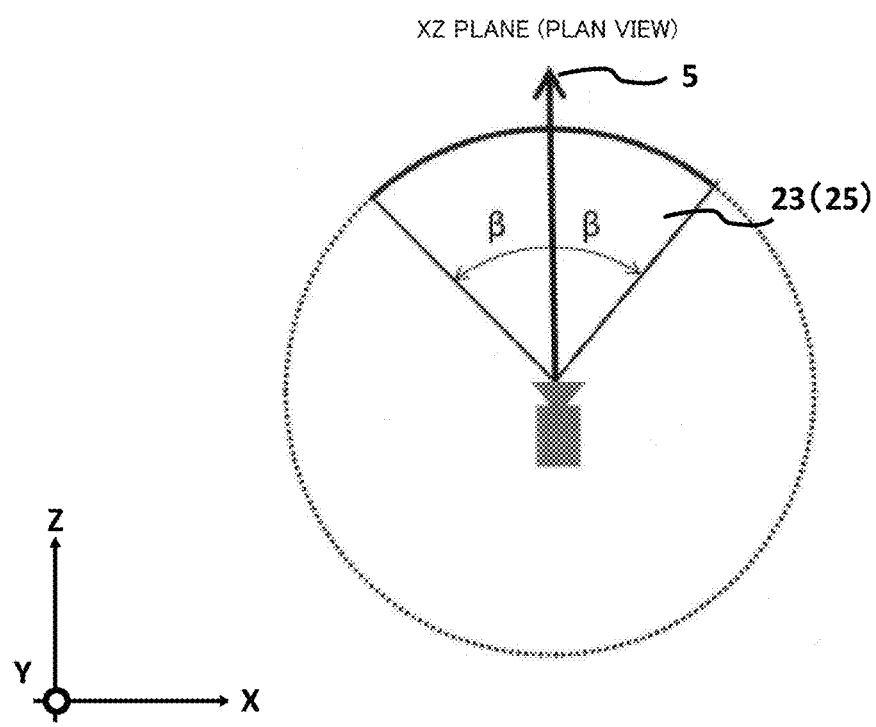
FIG. 7B is an XZ plane diagram when a sight region is viewed in a Y direction.

Sight region determination unit 250 determines sight region 23 of virtual camera 1 in virtual space 2 (step S120-5). As shown in FIG. 3, sight region 23 is a portion of virtual space image 22 which configures a sight of the user. Sight region 23 is determined based on reference line of sight 5 and reference line of sight 5 is determined based on a position and an inclination of virtual camera 1. FIG. 7A is a YZ plane view when sight region 23 is viewed in the X direction and FIG. 7B is an XZ plane view when sight region 23 is viewed in the Y direction.

According to one embodiment, sight region 23 comprises a first region 24 (see FIG. 7A) which is a range defined by reference line of sight 5 and a YZ cross-section of virtual space image 22 and a second region 25 (see FIG. 7B) which is a range defined by reference line of sight 5 and an XZ cross-section of virtual space image 22. First region 24 is set as a range comprising a polar angle α around reference line of sight 5. Second region 25 is set as a range comprising an azimuth angle β around reference line of sight 5.

Sight image generator 260 generates a sight image 26 based on sight region 23 (step S120-6). The sight image comprises a two-dimensional image for the left eye and a two-dimensional image for the right eye, and as a result of superimposition of these images on display 112, virtual space 2 as a three-dimensional image is provided to the user. HMD 110 has display 112 show sight image 26 based on information on sight image 26 received from control circuit unit 120 (step S110-2).

Figure 9:
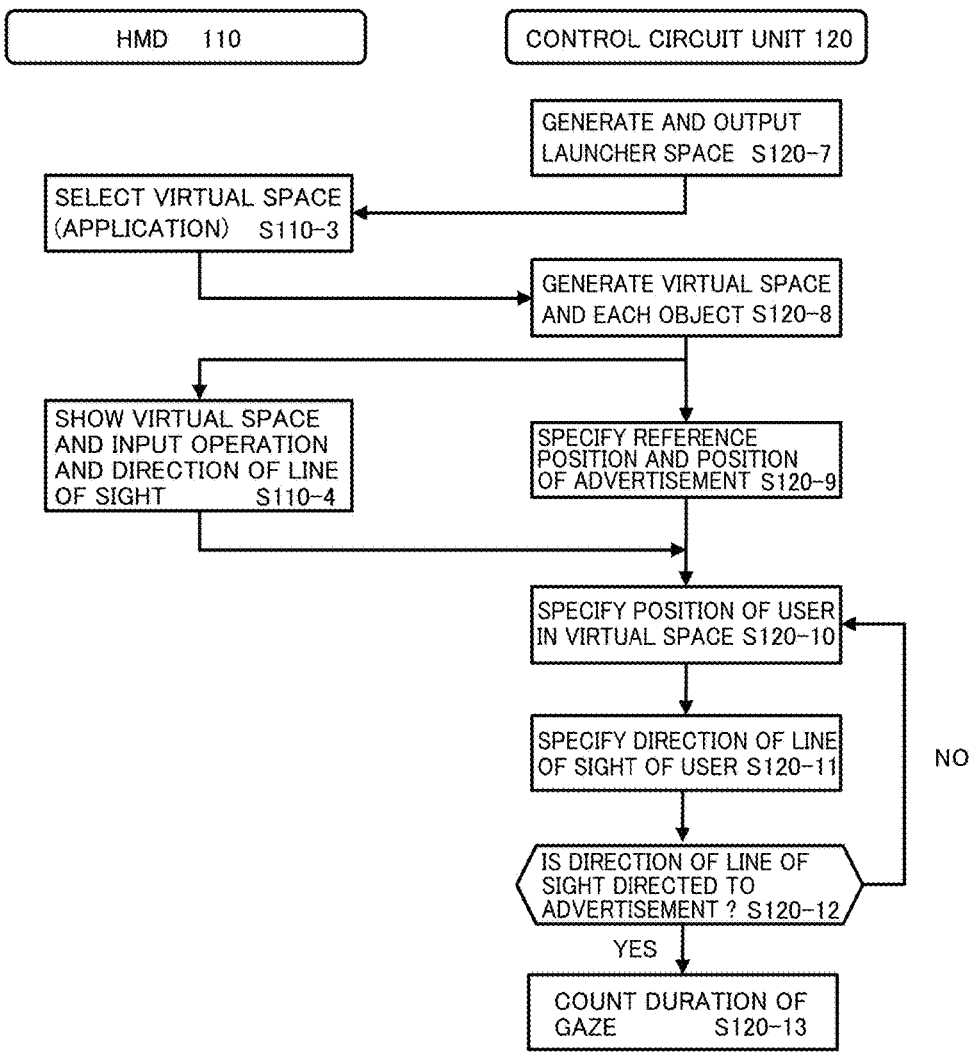
FIG. 9 is a flowchart showing processing for performing the functions of the HMD system.

Referring to FIG. 5 and FIG. 8 et seq., a specific example of the virtual space provided to the user and a processing flow in HMD system 100 for providing the virtual space to the user according to one embodiment will be described. As shown in FIGS. 8 and 9, the virtual space in one embodiment comprises a launcher space LAU and a first virtual space VR1 and a second virtual space VR2 associated with launcher space LAU. Initially, launcher space LAU is provided to the user who has launched HMD system 100 and wears HMD 110. A signal for providing launcher space LAU is generated by virtual space image generator 210 and sight image generator 260 and output to HMD 110 (step S120-7).

In launcher space LAU, an application AP1 for providing first virtual space VR1 and an application AP2 for providing second virtual space VR2 are shown. The user can move to a selected virtual space by performing a prescribed operation for giving an instruction to applications AP1 and AP2 (giving a look for a certain period of time or operating a controller) (step S110-3). In launcher space LAU, an advertisement space AD for showing an advertisement which will be described later and trial version spaces TR1 and TR2 for showing a downloaded trial version content are also shown.

Figure 10:
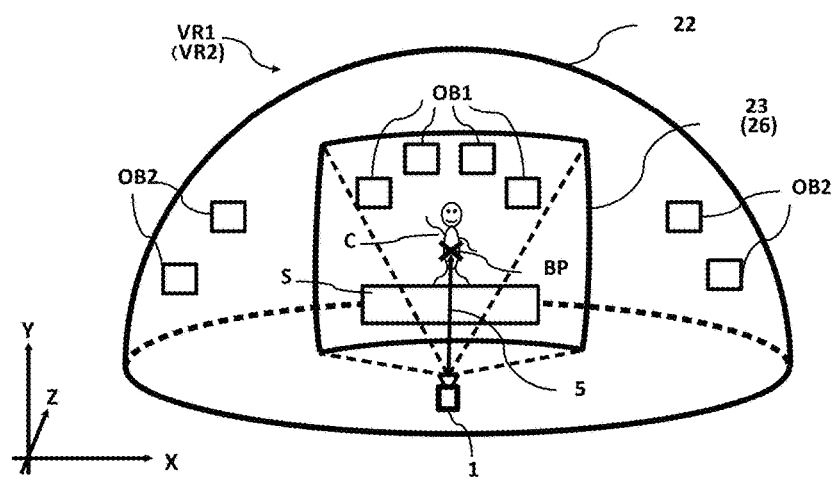
FIG. 10 is a diagram for illustrating the first virtual space and the second virtual space.

FIG. 10 shows one example of first virtual space VR1 according to one embodiment. When application AP1 is selected, virtual space image generator 210 generates virtual space image 22 configuring first virtual space VR1. Rendering unit 350 of object controller 300 generates various objects by referring to object information storage unit 360 and arranges the objects in first virtual space VR1 by rendering the objects (step S120-8). First virtual space VR1 is, for example, a content providing such performance as a live stage, and a stage S, a character C providing performance on stage S, and various advertisements OB1 and OB2 are arranged in first virtual space VR1.

Object controller 300 specifies a reference position BP in the virtual space and a position (a target object position) where advertisements OB1 and OB2 as target objects, for which a duration of gaze by the user is to be counted as will be described later, are arranged (step S120-9). Immediately after first virtual space VR1 is provided to the user, the user is located in the center of the celestial sphere of first virtual space VR1 and reference line of sight 5 which is the direction of line of sight of the user is directed to reference position BP (a reference direction BD which will be described later). In one embodiment, sight image 26 generated based on reference direction BD comprises stage S, character C, and a plurality of first advertisements (first target objects). In the following, an advertisement included in sight image 26 may be referred to as a first advertisement (first object) OB1 and an advertisement not included in sight image 26 may be referred to as a second advertisement (second object) OB2.

Since second virtual space VR2 is also the same as in FIG. 10, description thereof will not be repeated below. Briefly, when application AP2 is selected, virtual space image generator 210 generates virtual space image 22 configuring second virtual space VR2. Rendering unit 350 of object controller 300 generates various objects by referring to object information storage unit 360 and arranges the objects in second virtual space VR2 by rendering the objects (step S120-8). Stage S, character C, a plurality of second advertisements (second target objects), first advertisement (first object) OB1 included in sight image 26, and second advertisement (second object) OB2 not included in sight image 26 are arranged also in second virtual space VR2.

The user can freely move in first virtual space VR1 by inputting various motions such as change in position or inclination to HMD 110 (step S110-4). When motion sensor 130 senses a motion of the user, HMD operation sensor 220 accepts an input of a signal representing the motion and specifies a position of the user in the virtual space (step S120-10). When motion sensor 130 or gaze sensor 140 senses variation in reference line of sight 5 of the user, reference line-of-sight specifying unit 240 accepts an input of a signal representing the variation and specifies the direction of the line of sight of the user in the virtual space (step S120-11). Object controller 300 specifies the direction of the line of sight of the user based on a position of the user in the virtual space and on reference line of sight 5 of the user from reference line-of-sight specifying unit 240. Then, advertisement specifying unit 310 determines to which of advertisements OB1 and OB2 the direction of the line of sight is directed, based on information on a position of arrangement of various advertisements OB1 and OB2 (step S120-12). Advertisement specifying unit 310 specifies the direction of the line of sight of the user directed to any advertisements OB1 and OB2 as a direction of gaze GD.

Then, gaze duration measuring unit 320 starts count of a duration of gaze which is a time period during which the user gives the reference line of sight to the advertisement (step S120-13). When the direction of the line of sight of the user is directed to a certain range comprising a prescribed advertisement (a circle, an oval, or a polygon comprising the advertisement in the center), gaze duration measuring unit 320 regards the user as gazing at the advertisement and counts the duration of gaze.

Of a history of user actions as above, an action to gaze at a prescribed advertisement by the user is stored in user action storage unit 370. User action storage unit 370 comprises, for example, a user action management table T1 shown in FIG. 14. User action management table T1 stores not only information on which object the user gazed at at which time from which position in the virtual space in any application (virtual space) but also a time period during which the user gazed at the object.

Figure 11:
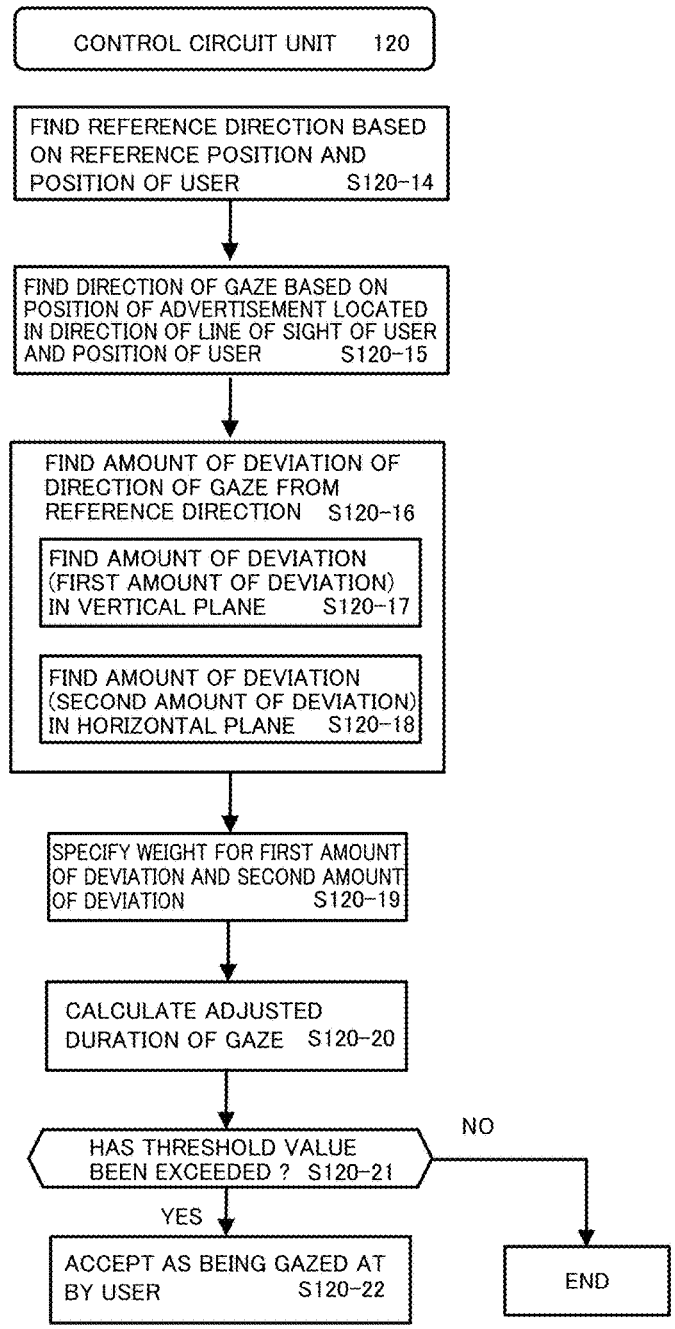
FIG. 11 is a flowchart showing processing for performing the functions of the HMD system.
Figure 12A:
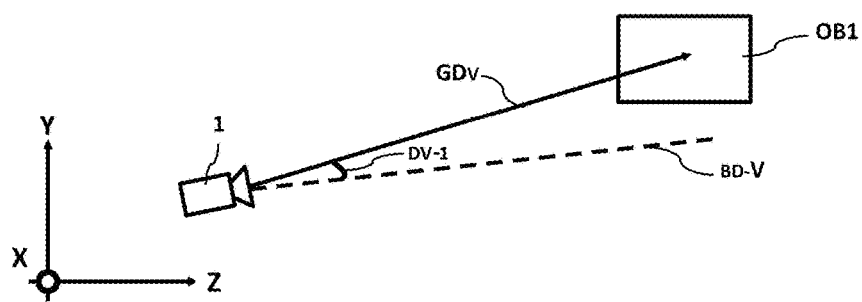
FIG. 12A is a YZ plane diagram illustrating a first amount of deviation of a direction of gaze from a reference direction.
Figure 12B:
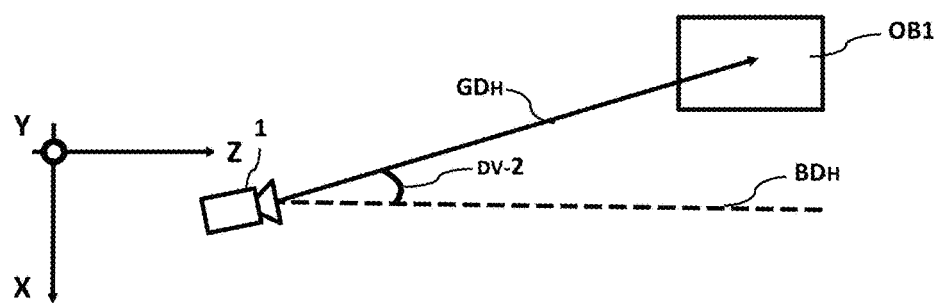
FIG. 12B is an XZ plane diagram illustrating a second amount of deviation of the direction of gaze from the reference direction.

The duration of gaze in which the user gazed at a prescribed advertisement may be stored as an adjusted duration of gaze based on a processing flow according to one embodiment shown in FIG. 11. FIG. 12A is a diagram showing a reference direction BD-V and a direction of gaze GD-V in a vertical plane (YZ plane) when viewed from the user according to one embodiment. FIG. 12B is a diagram showing a reference direction BD-H and a direction of gaze GD-H in a horizontal plane (XZ plane) when viewed from the user according to one embodiment.

Referring to FIG. 11, initially, control circuit unit 120 specifies reference direction BD based on reference position BP and a position of the user (a position of virtual camera 1) in first virtual space VR1 as described above (step S120-14). Here, reference direction BD-V in the vertical plane (YZ plane) and reference direction BD-H in the horizontal plane (XZ plane) are specified as reference direction BD. In one embodiment, since character C which is a leading role in a content is arranged on stage S, reference line of sight BD-V of the user is set in a slightly upward direction. Control circuit unit 120 specifies direction of gaze GD based on positions of various advertisements OB1 and a position of the user in first virtual space VR1 (step S120-15). Direction of gaze GD-V in the vertical plane (YZ plane) and direction of gaze GD-H in the horizontal plane (XZ plane) are specified as direction of gaze GD.

Then, object controller 300 finds an amount of deviation between direction of gaze GD and reference direction BD (step S120-16). In one embodiment, object controller 300 finds a first amount of deviation DV1 which is an amount of deviation of direction of gaze GD-V from reference direction BD-V in the vertical plane (a difference in angle) (step S120-17) and a second amount of deviation DV2 which is an amount of deviation of direction of gaze GD-H from reference direction BD-H in the horizontal plane (a difference in angle) (step S120-18).

Then, adjustment unit 330 calculates an adjusted duration of gaze, with first amount of deviation DV1 (angle: radian) and second amount of deviation DV2 (angle: radian) being incorporated in the duration of gaze (step S120-20).

Adjusted duration of gaze=Duration of gaze×{β1× $(DV1)^2$+1}×{β2×$(DV2)^2$+1}

β1 is a coefficient for weighting first amount of deviation DV1. β2 is a coefficient for weighting second amount of deviation DV2. Adjustment unit 330 can adjust the duration of gaze by placing importance on a history of actions to gaze at a certain advertisement by the user, who even takes an action more difficult to voluntarily take, by setting β1 and β2 to prescribed values in advance (step S120-19).

In one embodiment, weight coefficient β1 for first amount of deviation DV1 is greater than weight coefficient 132 for second amount of deviation DV2. The user is expected to feel more stress in moving the head portion in the vertical direction than moving the head portion in the horizontal direction. By thus placing importance on a user's action to move the line of sight in the vertical plane which is an action more difficult for the user to take, the user's interests can timely be approached.

DV1 and DV2 are values not smaller than $-\pi$ and not greater than $+\pi$. DV1 and DV2 are applied to calculation of an adjusted duration of gaze as being exponentiated (to the second power or more). Adjustment unit 330 can thus calculate an adjusted duration of gaze by placing more importance on an action to gaze at an advertisement by the user who even averts his/her line of sight far from the reference direction. The adjusted duration of gaze is stored in user action management table T1 in user action storage unit 370.

Determination unit 340 determines whether or not the adjusted duration of gaze has exceeded a prescribed threshold value (step S120-21). In one embodiment, it is assumed that when the adjusted duration of gaze is equal to or longer than 5 seconds, the user is interpreted to have shown interests in the advertisement, and control circuit unit 120 sets the threshold value to 5 seconds. When the adjusted duration of gaze exceeds the prescribed threshold value, control circuit unit 120 accepts a result that the user gazed at the advertisement (step S120-22).

Figure 13A:
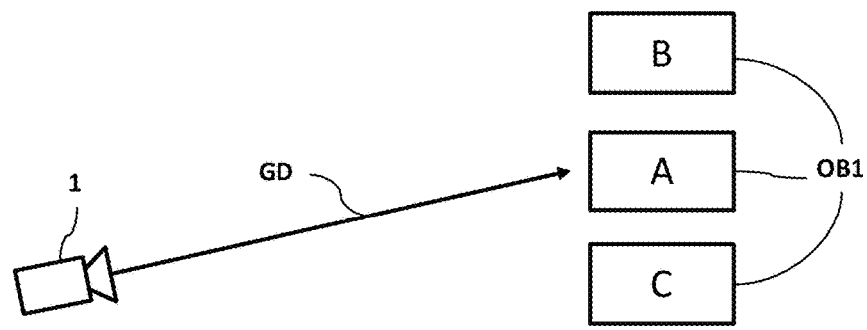
Figure 13B:
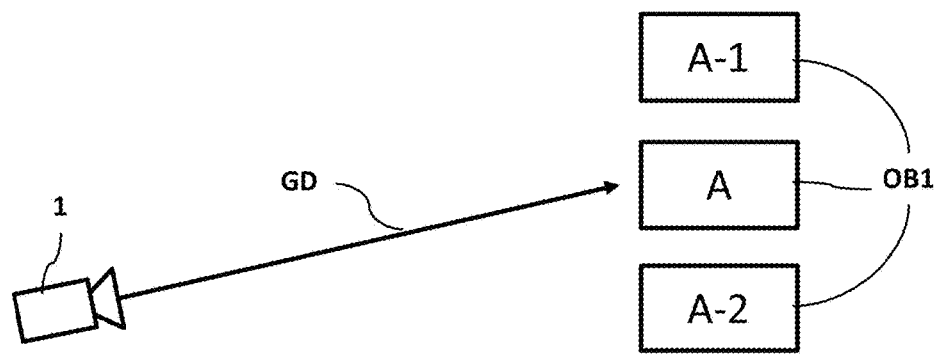

FIGS. 13A and 13B show one example of processing when a result that the user gazed at the advertisement is accepted. FIG. 13A shows a state before gaze by the user is accepted. FIG. 13B shows a state after gaze by the user is accepted. In a state before acceptance, three advertisements A, B and C are shown as advertisement OB1 in sight region 23. When gaze by the user at advertisement OB1 in which advertisement A is shown is accepted, rendering unit 350 varies a representation of advertisement OB1 in which advertisement B is shown to an advertisement A-1 relating to advertisement A, and varies a representation of advertisement OB1 in which advertisement C is shown to an advertisement A-2 relating to advertisement A. Thus, when the user gazes at a prescribed object, another object in the field of view of the user is varied to relate to the object which was gazed at. The user's interests can thus timely be approached.

FIG. 15 shows a flow of processing when the user inputs an instruction to quit first virtual space VR1 to HMD 110 (step S110-5) while the adjusted duration of gaze at a prescribed advertisement is specified in first virtual space VR1 (step S120-23). In this case, determination unit 340 specifies a priority of each advertisement by referring to user action storage unit 370 (step S120-24). The priority of the advertisement is specified by a total value of the adjusted duration of gaze, and the priority of the advertisement at the time point of end of first virtual space VR1 is specified as A-2>A>A-1 as shown in FIG. 14.

Figure 16:
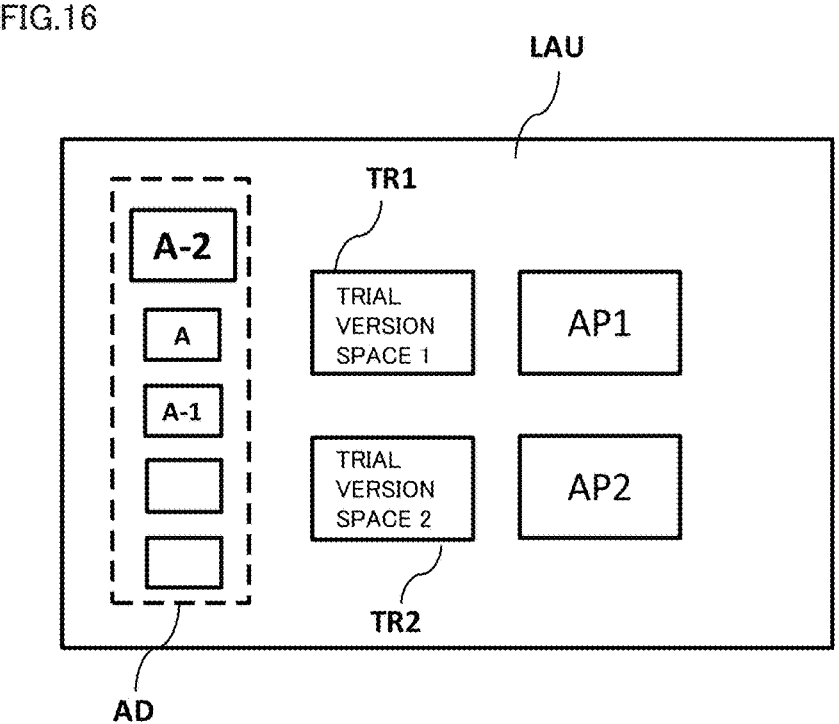
FIG. 16 is a diagram for illustrating the launcher space.
Figure 18:
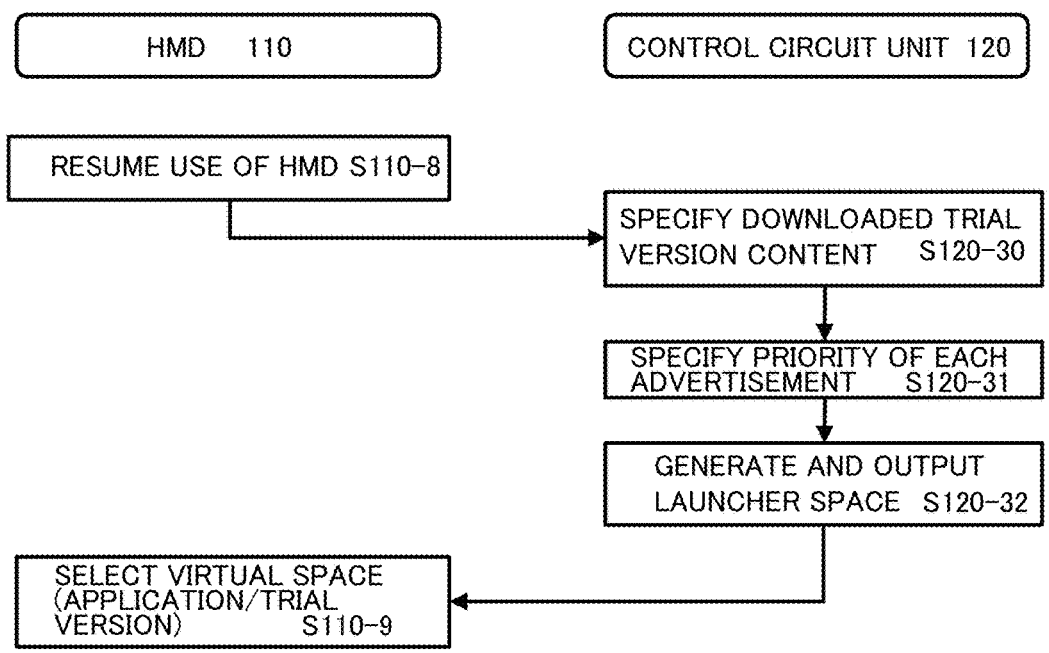
FIG. 18 is a flowchart showing processing for performing the functions of the HMD system.

Determination unit 340 transmits information on the priority of the advertisement to sight image generator 260. Sight image generator 260 generates based on the information, a signal for showing launcher space LAU as shown in FIG. 16 and outputs the signal to HMD 110 (step S120-25). In advertisement space AD in launcher space LAU, a plurality of advertisements are arranged in accordance with the priority. Advertisement A-2 determined as highest in priority may be shown in a large size or as being somewhat emphasized.

In succession, when the user selects application AP2 for launching second virtual space VR2, second virtual space VR2 is provided on HMD 110 (step S110-6). In second virtual space VR2 as well, a duration of gaze by the user at an advertisement (an adjusted duration of gaze) is specified (step S120-26) through the processing flow similar to that for first virtual space VR1.

When the user quits use of HMD 110 (step S110-7), determination unit 340 specifies a total adjusted duration of gaze as a total duration of gaze (step S120-27). The total adjusted duration of gaze is managed in a priority management table T2 shown in FIG. 17. Priority management table T2 is stored in user action storage unit 370.

Control circuit unit 120 calculates a total value of the adjusted duration of gaze for each advertisement based on user action management table T1. In one embodiment, as shown in user action management table T1, the user gazes at advertisement A-2 in first virtual space VR1 and second virtual space VR2. Since the user gazes at advertisement A-2 from different user positions, the user's interests while he/she wears the HMD can more accurately be found by totaling the adjusted durations of gaze, with the direction of the line of sight of the user being taken into account. Therefore, the total value of the adjusted durations of gaze is managed in priority management table T2.

Determination unit 340 sets a priority for each advertisement based on the total adjusted duration of gaze. A higher priority is given in the descending order of the total adjusted durations of gaze. Advertisement A-1 of which total adjusted duration of gaze does not exceed 5 seconds set as the threshold value is excluded from advertisements for which priority is to be set.

Determination unit 340 determines whether or not there is a trial version content as an expansion content associated with each advertisement for which a priority has been set. In one embodiment, since two trial version spaces TR1 and TR2 are set in launcher space LAU, top two advertisements among advertisements having trial version contents are specified (advertisements B and B-1). When the trial version content is specified, determination unit 340 instructs communication controller 400 to output a download request for downloading the trial version content. When communication controller 400 receives the instruction and information notifying that the user has quitted use of the HMD from HMD 110, a request unit 410 instructs a communication processor 420 to output a download request. Communication processor 420 connects to external server 160 through network 150 and transmits a request for downloading the trial version content. External server 160 transmits the trial version content to communication processor 420 through network 150 based on the download request.

Thus, in one embodiment, an expansion content associated with an advertisement (for example, a trial version game) can be downloaded while the user is not using HMD 110. Thus, an expansion content can be provided without giving the user who is using HMD 110 uncomfortableness such as a poorer communication condition.

Figure 19:
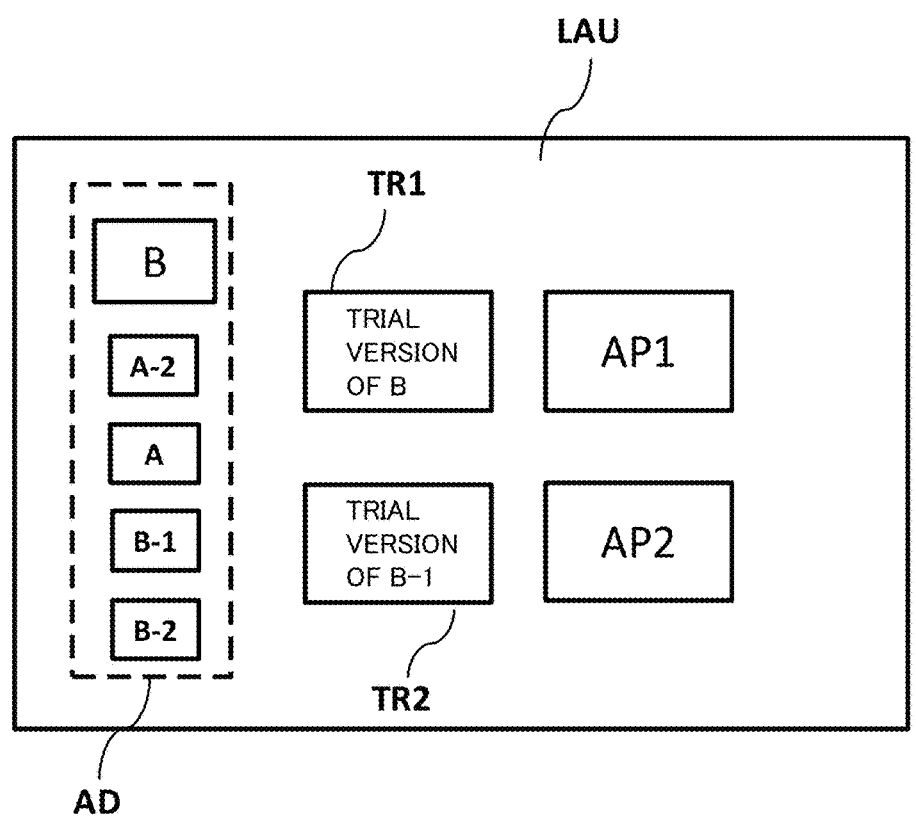
FIG. 19 is a diagram for illustrating the launcher space.

When the user resumes use of HMD 110, control circuit unit 120 specifies a downloaded trial version content (step S120-30). In one embodiment, whether or not downloading of the trial version content associated with advertisement B and advertisement B-1 has been completed is determined, and when downloading has been completed, the downloaded trial version content is specified. As described previously, a priority of each advertisement set at the time when the user previously used HMD 110 is specified by referring to priority management table T2 (step S120-31). Thereafter, sight image generator 260 generates launcher space LAU shown in FIG. 19 and outputs the launcher space to HMD 110 (step S120-32). In advertisement space AD in launcher space LAU, advertisements up to the priority of 5 are arranged in the descending order. Advertisement B highest in priority is shown in a large size as being emphasized. In trial version spaces TR1 and TR2, trial version contents associated with advertisement B and advertisement B-1 are arranged.

The user can select any of trial version contents arranged in first virtual space VR1, second virtual space VR2, and trial version spaces TR1 and TR2 and can enjoy the corresponding virtual space. By selecting an advertisement, the user can also indicate transmission of information on the advertisement to another information terminal (a personal computer or a smartphone).

Once the user has put off HMD 110, even though the user gazes at an advertisement in a virtual space in which the user is subsequently immersed, a duration of such gaze may not be added to the duration of gaze at the advertisement at the time when the user had previously worn HMD 110. Processing for adding durations of gaze at an advertisement is performed for an individual period during which HMD 110 is worn. Thus, content providing means which can timely approach also temporary increase in user's interests can be provided without averaging the user's interests over a certain long period.

[Hardware Configuration]

Figure 20:
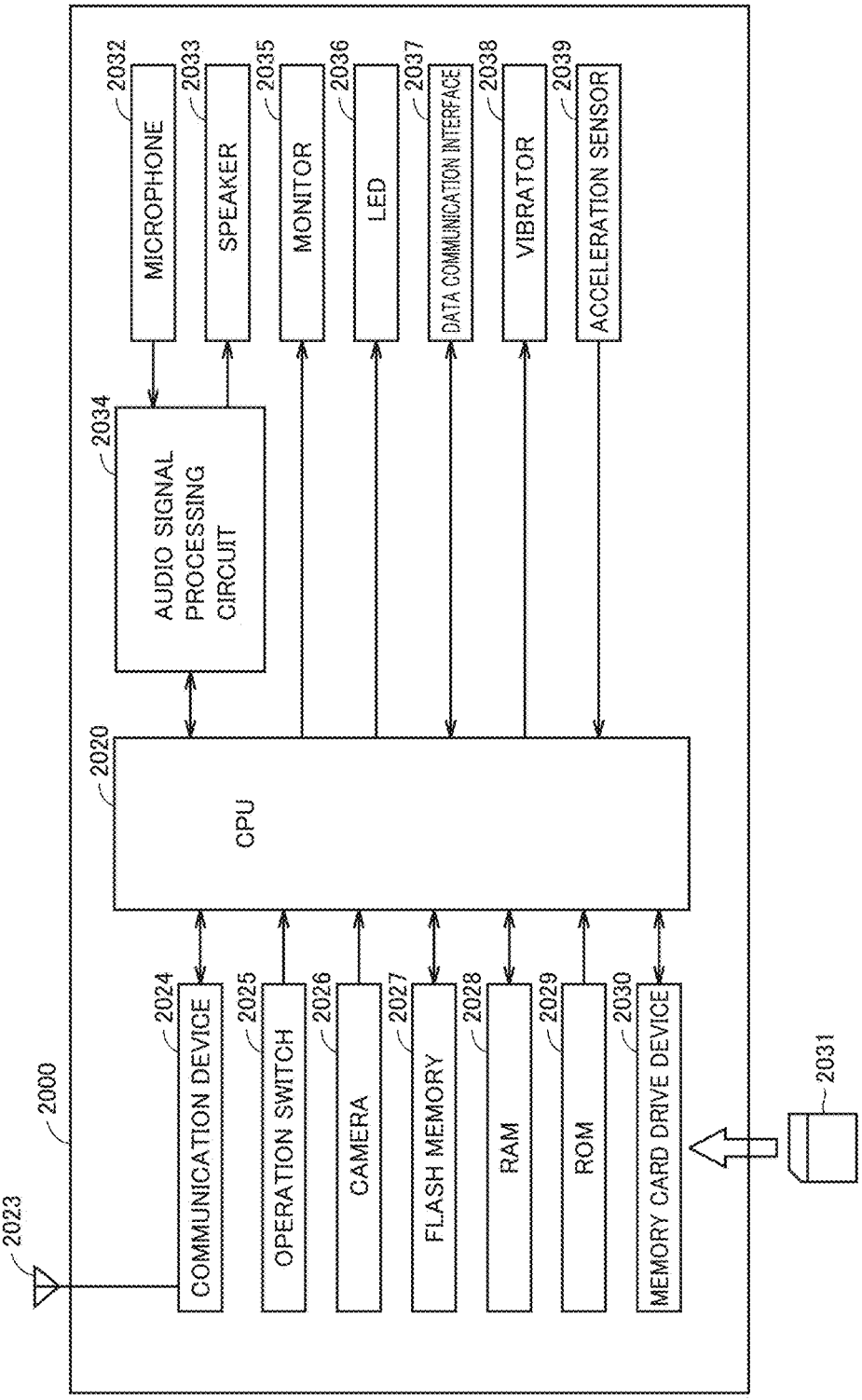
FIG. 20 is a block diagram showing a hardware configuration of an information processing terminal 2000 functioning as a control circuit unit 120 according to one embodiment.

Referring to FIG. 20, one example of a specific configuration of control circuit unit 120 will be described. FIG. 20 is a block diagram showing a hardware configuration of an information processing terminal 2000 which functions as control circuit unit 120 according to one embodiment. Information processing terminal 2000 comprises a CPU 2020, an antenna 2023, a communication device 2024, an operation switch 2025, a camera 2026, a flash memory 2027, a RAM 2028, a read-only memory (ROM) 2029, a memory card drive device 2030, a microphone 2032, a speaker 2033, an audio signal processing circuit 2034, a monitor 2035, an LED 2036, a data communication interface 2037, a vibrator 2038, and an acceleration sensor 2039. A memory card 2031 can be attached to memory card drive device 2030.

Antenna 2023 receives a signal emitted from a base station or transmits a signal for communicating with another communication device through a base station. The signal received by antenna 2023 is subjected to front end processing by communication device 2024 and thereafter the processed signal is sent to CPU 2020.

Operation switch 2025 accepts an operation onto information processing terminal 2000. Operation switch 2025 is implemented, for example, as a hard key or a soft key shown on a touch panel monitor. When operation switch 2025 accepts an operation, it sends a signal in accordance with an operation mode of information processing terminal 2000 at that time to CPU 2020.

CPU 2020 performs processing for controlling an operation of information processing terminal 2000 based on an instruction given to information processing terminal 2000. When information processing terminal 2000 receives a signal, CPU 2020 performs processing defined in advance based on the signal sent from communication device 2024, and sends the processed signal to audio signal processing circuit 2034. Audio signal processing circuit 2034 subjects the signal to signal processing defined in advance and sends the processed signal to speaker 2033. Speaker 2033 outputs voice and sound based on the signal.

Microphone 2032 accepts utterance to information processing terminal 2000 and sends a signal corresponding to the uttered voice to audio signal processing circuit 2034. Audio signal processing circuit 2034 performs processing defined in advance for conversation based on the signal and sends the processed signal to CPU 2020. CPU 2020 converts the signal into data for transmission and sends the resultant data to communication device 2024. Communication device 2024 generates a signal for transmission by using the data and sends the signal to antenna 2023.

Flash memory 2027 temporarily stores data necessary for processing to be performed by CPU 2020. CPU 2020 reads data temporarily stored in flash memory 2027 and performs processing defined in advance by using the data.

RAM 2028 temporarily holds data generated by CPU 2020 based on an operation performed on operation switch 2025. ROM 2029 stores a program or data for having information processing terminal 2000 perform a predetermined operation. CPU 2020 reads the program or the data from ROM 2029 and controls an operation of information processing terminal 2000.

Memory card drive device 2030 reads data stored in memory card 2031 and sends the data to CPU 2020. Memory card drive device 2030 writes data output from CPU 2020 into an empty area in memory card 2031.

Audio signal processing circuit 2034 performs signal processing for conversation as described above. Though CPU 2020 and audio signal processing circuit 2034 are shown in the example in FIG. 20 as separate features, CPU 2020 and audio signal processing circuit 2034 may be integrated in another aspect.

Monitor 2035 comprises, for example, a liquid crystal display or an organic electroluminescence (EL) display of a touch panel type, however, a mechanism of a touch panel is not particularly limited. Monitor 2035 shows an image defined by data obtained from CPU 2020, based on the data.

LED 2036 emits light based on a signal from CPU 2020. Data communication interface 2037 accepts attachment of a data communication cable. Data communication interface 2037 sends a signal output from CPU 2020 to the cable. Alternatively, data communication interface 2037 sends data received through the cable to CPU 2020. Vibrator 2038 performs a vibration operation at a predetermined frequency based on a signal output from CPU 2020. Acceleration sensor 2039 detects a direction of acceleration applied to information processing terminal 2000. A result of detection is input to CPU 2020.

Figure 21:
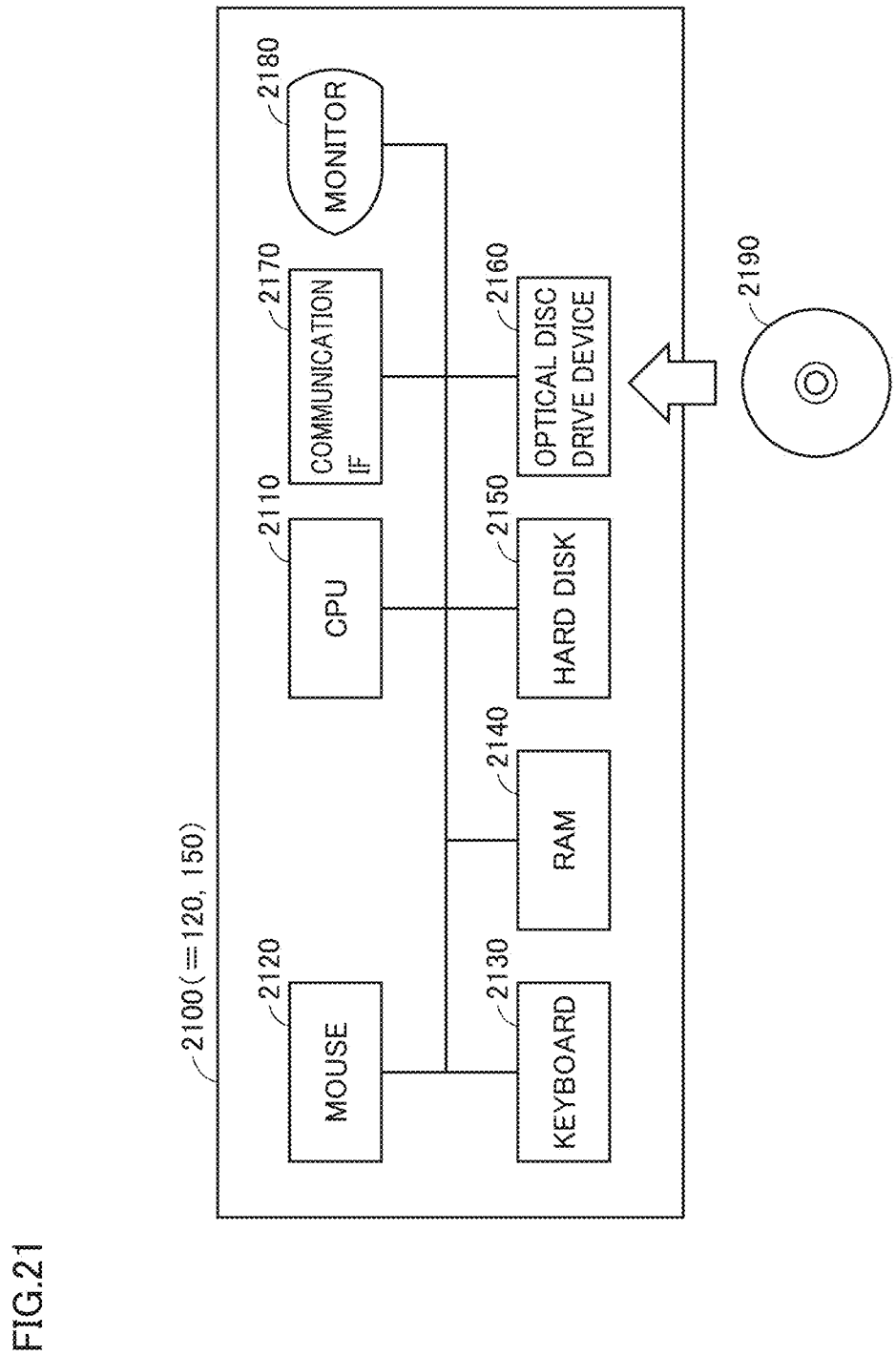
FIG. 21 is a block diagram showing a hardware configuration of a computer 2100 according to one embodiment.

Referring to FIG. 21, a configuration of a computer 2100 will be described. FIG. 21 is a block diagram showing a hardware configuration of computer 2100 according to one embodiment. In one aspect, control circuit unit 120 or a server 160 are implemented by computer 2100.

Computer 2100 comprises as main constituent elements, a CPU 2110 executing a program, a mouse 2120 and a keyboard 2130 which accept input of an instruction from a user of computer 2100, a RAM 2140 temporarily storing data generated as a result of execution of a program by CPU 2110 or data input through mouse 2120 or keyboard 2130, a hard disk 2150 storing data in a non-volatile manner, an optical disc drive device 2160, a communication interface (interface) 2170, and a monitor 2180. The constituent elements are connected to one another through a bus. A CD-ROM 2190 or another optical disc is attached to optical disc drive device 2160. Communication interface 2170 comprises a universal serial bus (USB) interface, a wired local area network (LAN), a wireless LAN, and a Bluetooth™ interface, however, it is not limited thereto.

Processing in computer 2100 is performed by hardware and software executed by CPU 2110. Such software may be stored in advance in hard disk 2150. Software may be stored in CD-ROM 2190 or other computer readable non-volatile data storage media and distributed as a program product. Alternatively, the software may be provided as a program product which can be downloaded by an information provider connected to the Internet or other networks. Such software is read from a data storage medium by optical disc drive device 2160 or other data readers or downloaded through communication interface 2170 and stored once in hard disk 2150. The software is read from hard disk 2150 by CPU 2110 and stored in RAM 2140 in a format of an executable program. CPU 2110 executes the program.

Each constituent element implementing computer 2100 shown in FIG. 21 is general. Therefore, the most essential part according to the present embodiment may be a program stored in computer 2100. Since an operation of hardware of computer 2100 has been well known, detailed description will not be repeated.

A data storage medium is not limited to a CD-ROM, a flexible disk (FD), and a hard disk, and may be a non-volatile data storage medium which carries a program in a fixed manner, such as a magnetic tape, a cassette tape, an optical disk (a magnetic optical disc (MO)/a mini disc (MD)/a digital versatile disc (DVD)), an integrated circuit (IC) card (including memory cards), an optical card, and a semiconductor memory such as a mask ROM, an electronically programmable read-only memory (EPROM), an electronically erasable programmable read-only memory (EEPROM), and a flash ROM.

The program herein may comprise not only a program directly executable by CPU 2110, but also a program in the form of a source program, a compressed program, and an encrypted program.

Though an embodiment of the present disclosure has been described above, the present disclosure is not limited to the embodiment. A person skilled in the art would understand that various modifications to the embodiment can be made without departing from the spirit and scope of this disclosure described in the claims described previously.

For example, though a priority of a content is determined based on an adjusted duration of gaze in the embodiment described above, a priority may be determined based on a duration of gaze before adjustment.

Though advertisements A, A-1 and A-2 which are contents associated with one another are handled as being not associated in calculation of a duration of gaze or a total adjusted duration of gaze in the embodiment described above, they may be handled as being associated with one another. For example, a priority may be determined by totaling durations of gaze or adjusted durations of gaze at advertisements A, A-1 and A-2, with advertisements A, A-1 and A-2 being integrated. In this case, when a priority of advertisements A, A-1 and A-2 is determined as high, all advertisements and expansion contents associated with advertisements A, A-1 and A-2 may be shown in launcher space LAU.

Though the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method for providing a virtual space in which a user is immersed, by using a head-mounted display, the method comprising:
   generating the virtual space and a plurality of target objects in the virtual space;
   defining a target object position for each target object of the plurality of target objects where each of the plurality of target objects is arranged;
   defining a sight region of the user based on a direction of a line of sight of the user specified in accordance with an inclination of the head-mounted display;
   specifying a plurality of first objects which are a first set of the plurality of target objects included in the sight region and a second object which is a target object of the plurality of target objects not included in the sight region;
   showing an advertisement in each of the plurality of the first objects and the second object; and
   when gaze by the user at any of the plurality of the first objects is accepted, varying only the advertisement shown in the first object other than the first object which has accepted gaze by the user among the plurality of the target objects so as to be associated with the advertisement shown in the first object which has accepted gaze by the user.

2. The method according to claim 1, wherein the gaze at a first object of the plurality of first objects is accepted when a duration in which the direction of the line of sight is oriented to the first object exceeds a prescribed threshold value.

3. A non-transitory computer-readable medium storing computer-readable instructions that, when executed by a processor of a computer, perform:
   generating the virtual space and a plurality of target objects in the virtual space;
   defining a target object position for each target object of the plurality of target objects where each of the plurality of target objects is arranged;
   defining a sight region of the user based on a direction of a line of sight of the user specified in accordance with an inclination of the head-mounted display;
   specifying a plurality of first objects which are a first set of the plurality of target objects included in the sight region and a second object which is a target object of the plurality of target objects not included in the sight region;
   showing an advertisement in each of the plurality of the first objects and the second object; and
   when gaze by the user at any of the plurality of the first objects is accepted, varying only the advertisement shown in the first object other than the first object which has accepted gaze by the user among the plurality of the target objects so as to be associated with the advertisement shown in the first object which has accepted gaze by the user.

4. The non-transitory computer-readable medium according to claim 3, wherein the gaze at a first object of the plurality of first objects is accepted when a duration in which the direction of the line of sight is oriented to the first object exceeds a prescribed threshold value.

\* \* \* \* \*